US010924264B2

(12) United States Patent
Wilson et al.

(10) Patent No.: US 10,924,264 B2
(45) Date of Patent: Feb. 16, 2021

(54) DATA VALIDATION AND STORAGE

(71) Applicant: Barclays Execution Services Limited, London (GB)

(72) Inventors: Julian Wilson, Cheshire (GB); David Fulton, Cheshire (GB)

(73) Assignee: Barclays Execution Services Limited, London (GB)

( * ) Notice: Subject to any disclaimer, the term of this patent is extended or adjusted under 35 U.S.C. 154(b) by 36 days.

(21) Appl. No.: 15/742,619

(22) PCT Filed: Jul. 8, 2016

(86) PCT No.: PCT/GB2016/052072
§ 371 (c)(1),
(2) Date: Jan. 8, 2018

(87) PCT Pub. No.: WO2017/006135
PCT Pub. Date: Jan. 12, 2017

(65) Prior Publication Data
US 2018/0205537 A1    Jul. 19, 2018

(30) Foreign Application Priority Data

Jul. 8, 2015 (GB) .................................... 1511961
Jul. 10, 2015 (GB) .................................... 1512123

(51) Int. Cl.
*H04L 9/06* (2006.01)
*G06Q 20/38* (2012.01)
(Continued)

(52) U.S. Cl.
CPC ....... *H04L 9/0637* (2013.01); *G06Q 20/0658* (2013.01); *G06Q 20/3829* (2013.01);
(Continued)

(58) Field of Classification Search
CPC ....... H04L 9/0637; H04L 9/30; H04L 9/3242; G06Q 20/0658; G06Q 20/3829;
(Continued)

(56) References Cited

U.S. PATENT DOCUMENTS 9,892,460 B1    2/2018   Winklevoss et al.
2011/0110524 A1  5/2011   Moreh et al.
(Continued)

FOREIGN PATENT DOCUMENTS

WO   WO-2015/022553          2/2015
WO   WO-2015175722 A1 * 11/2015   ............ H04W 12/02

OTHER PUBLICATIONS

Dennis et al., Rep on the block: A next generation reputation system based on the blockchain, 2015, 10th International Conference for Internet Technology and Secured Transactions, pp. 131-138 (Year: 2015).*

(Continued)

*Primary Examiner* — Kenneth W Chang
(74) *Attorney, Agent, or Firm* — Wilmer Cutler Pickering Hale and Dorr LLP

(57) ABSTRACT

Method and system for recording data describing a first entity, the data endorsed by a second entity comprising the second entity validating data describing the first entity, wherein an identifier is associated with the data, the identifier being generated from a public key of the first entity. Cryptographically signing data corresponding with the data describing the first entity using at least a private key of the second entity. Posting a transaction to a block chain including the cryptographically signed data. Method and system for obtaining data describing a first entity the data endorsed by a second entity comprising. Receiving an identifier of data describing the first entity. Retrieving an entry from a block chain based on the received identifier. Authenticating (Continued)

the entry using a public key of the second entity. Extracting the data describing the first entity from the retrieved entry.

22 Claims, 7 Drawing Sheets

(51) Int. Cl.
*G06Q 20/40* (2012.01)
*G06Q 30/06* (2012.01)
*G06Q 20/06* (2012.01)
*H04L 9/30* (2006.01)
*H04L 9/32* (2006.01)

(52) U.S. Cl.
CPC ..... *G06Q 20/4016* (2013.01); *G06Q 30/0601* (2013.01); *G06Q 30/0617* (2013.01); *H04L 9/30* (2013.01); *H04L 9/3242* (2013.01); *G06Q 2220/00* (2013.01)

(58) Field of Classification Search
CPC ........... G06Q 20/4016; G06Q 30/0601; G06Q 30/0617; G06Q 2220/00
See application file for complete search history.

(56) References Cited

U.S. PATENT DOCUMENTS

| | | | | |
|---|---|---|---|---|
| 2015/0052066 | A1* | 2/2015 | Vincent | G06Q 20/38215 705/76 |
| 2015/0081566 | A1 | 3/2015 | Slepinin | |
| 2015/0154717 | A1 | 6/2015 | Stibel et al. | |
| 2015/0244690 | A1* | 8/2015 | Mossbarger | H04L 63/061 713/171 |
| 2015/0287026 | A1* | 10/2015 | Yang | G06Q 20/06 705/69 |
| 2015/0324787 | A1* | 11/2015 | Schaffner | G06Q 20/3825 705/67 |
| 2015/0356523 | A1 | 12/2015 | Madden | |
| 2015/0371224 | A1* | 12/2015 | Lingappa | G06Q 20/3829 705/71 |
| 2016/0098723 | A1 | 4/2016 | Feeney | |
| 2016/0260169 | A1* | 9/2016 | Arnold | G06Q 40/12 |
| 2016/0330035 | A1 | 11/2016 | Ebrahimi et al. | |
| 2016/0342977 | A1 | 11/2016 | Lam | |
| 2016/0342989 | A1* | 11/2016 | Davis | G06Q 20/385 |
| 2017/0238164 | A1 | 8/2017 | Pang et al. | |
| 2018/0121923 | A1 | 5/2018 | Uhr et al. | |
| 2018/0205537 | A1 | 7/2018 | Wilson et al. | |

OTHER PUBLICATIONS

Becker, "Merkle Signature Schemes, Merkle Trees and Their Cryptanalysis," Jul. 18, 2008. 28 pages. (https://www.emsec.ruhr-uni-bochum.de/media/crypto/attachments/files/2011/04/becker_1.pdf).
Antonopoulos, "Mastering Bitcoin" O'Reilly Media, Dec. 20, 2014. 282 pages.
Bruce, "The Mini-Blockchain Scheme," Cryptonite.info, Jul. 2014. 13 pages. (http://cryptonite.info/files/mbc-scheme-rev2.pdf).
Examination Report dated Apr. 15, 2020, in the European application: 16738524.4. 6 pages.
International Search Report and Written Opinion dated Oct. 14, 2016, in the International Application No. PCT/GB2016/052070. 8 pages.
International Search Report and Written Opinion dated Oct. 27, 2016, in the International Application No. PCT/GB2016/052072. 11 pages.
Nakamoto, "Bitcoin: A Peer-to-Peer Electronic Cash System," Bitcoin.com, Nov. 1, 2014. 9 pages. (https://bitcoin.org/bitcoin.pdf).
Patel, "A block chain based decentralized exchange," International Association for Cryptologic Research, Dec. 18, 2014, vol. 20141225:065012. 9 pages.
Van Saberhagen, "CryptoNote v 2.0", white paper from Cryptonote.org, Oct. 17, 2013. 20 pages. (https://cryptonote.org/whitepaper.pdf).
Vayngrib, "KYC. Tradle/about Wiki," GitHub, Mar. 1, 2015. 4 pages. (https://github.com/tradle/about/wiki/kyc).
Vayngrib, "Objects on chain. Tradle/about Wiki," GitHub, Mar. 18, 2015. 3 pages. (https://github.com/tradle/about/wiki/objects-on-chain#slinky).

* cited by examiner

Figure 9

Claims Tree

| Claim ID = 1 | Name = David Fulton | Pub Key = $P_1$ |
| Claim ID = 2 | Address = Radbroke Hall | Pub Key = $P_2$ |
| Claim ID = 3 | DOB = 24/09 | Pub Key = $P_3$ |
| Claim ID = 4 | Employed = TRUE | Pub Key = $P_4$ |

Attestations Tree

| Claim ID = 1 | Attestor=Barclays | Signature=sig(<claim>,b) |
| Claim ID = 2 | Attestor=DVLA | Signature=sig(<claim>,b) |
| Claim ID = 3 | Attestor=Vodafone | Signature=sig(<claim>,b) |
| Claim ID = 4 | Attestor=Tesco | Signature=sig(<claim>,b) |
| Claim ID = 4 | Attestor=HMRC | Signature=sig(<claim>,b) |

Authorities Tree

| Attestor = Barclays | Rights = Attest, Revoke | Pub Key = B |
| Attestor = Vodafone | Rights = Attest, Revoke | Pub Key = B |
| Attestor = Tesco | Rights = Attest, Revoke | Pub Key = B |
| Attestor = DVLA | Rights = Attest, Revoke | Pub Key = B |
| Attestor = HMRC | Rights = Attest, Revoke | Pub Key = B |

Figure 10

```
TRANSFER                funds
FROM                    b.Coin amount X (Customer)
TO                      b.Coin amount Y (Merchant)
TRANSACTION SIGNATURE   sig(<transaction>, <amount X owner key>)
RELATED CLAIM ID        encrypt (<claim 3>, <Merchant public key>)
CLAIM SIGNATURE         sig(<transaction>, <claim key $p_3$>)
```

DATA VALIDATION AND STORAGE

CROSS-REFERENCE TO RELATED APPLICATIONS

This application is a U.S. National Phase Application under 35 U.S.C. 371 of International Application No. PCT/GB2016/052072, filed 8 Jul. 2016, which claims priority to Great Britain Patent Application No. 1511961.3, filed 8 Jul. 2015 and Great Britain Patent Application No. 1512123.9, filed 10 Jul. 2015, the entire contents of which are incorporated herein by reference in their entireties.

FIELD OF THE INVENTION

The present invention relates to a system and method for storing and endorsing data describing an entity more efficiently and in particular data describing a person or company. The data are stored and retrieved from a computer system or network.

BACKGROUND OF THE INVENTION

It is important for separate entities to obtain and hold information about each other securely and by maintaining privacy. This is especially true when entities interact over computer networks such as the internet or using telecommunications networks. It can also be important that each entity has confidence that information describing other entities is accurate and trustworthy. For example, one entity may wish to securely communicate electronically with another entity. This security may depend upon the trustworthiness of the particular entities involved. Determining and verifying such information can introduce overheads and additional work leading to inefficiencies and extra load for a computer or telecommunications network. Furthermore, such verification often depends on separate sources, each of which may also need to be verified. This may require significant bandwidth and processing resources.

In one particular example, an entity could be a financial institution such as a bank and another entity may be a customer of that bank (either personal or company). For the bank to be able to provide services to the customer (especially online services), then they must carry out certain "Know Your Customer" (KYC) checks and abide by particular standards set by one or more jurisdictions or authorities. This may be a manual process in which the customer provides the bank with utility statements, a driving license or a passport, or other forms of documentation and identification. Whilst these KYC standards require separate sources of information to improve the reliability of the checks, these processes may be open to fraud, especially from determined adversaries. Manually checking each customer can be laborious and may involve duplication of effort, especially if the customer has accounts or interacts with different organisations.

In another example, a person may only be able to purchase certain items (e.g. alcohol or kitchen knives) if they can prove to a merchant that they are over a certain age. In a face-to-face environment such as a shop, it may be readily apparent if a person is underage. However, such an assessment can be difficult, and time consuming for online purchases. Whilst proof of age may be achieved by presenting a form of identifier, such as a passport or driving license, this can be inconvenient for the customer and also open to forgery and other abuses. Presenting personal documentation over the public internet introduces additional security risks and so requires further computing resources (e.g. encryption algorithms) to be done securely. Stronger and more reliable checks may be carried out but this can involve additional costs and steps not warranted or appropriate for low cost or risk transactions (e.g. purchasing a small amount of common over-the-counter medication).

In another example, two separate entities may be computer systems that wish to communicate or engage in a transfer of data. It may be convenient for the separate entities to communicate over a public network such as the internet, but this can involve risks. Again, checks may be carried out in advance or during the communication to ensure that each entity knows who and what they are exchanging data with, but this may also increase overheads, reduce available bandwidth and involve additional processing requirements. Reducing such checks can reduce the overheads, but also increases risk.

http://securekey.com describes defined trusted networks. In this model, third parties are allowed to vouch for the identity of others without the need for the identified party to have to reveal their identity. www.Klout.com provides a social media linked influence and popularity score. www.peerreach.com provides a further social media derived measure of expertise and interests. However, all of these systems have a centralised approach relying on a single body.

Therefore, there is required a method and system that overcomes such problems, provides a more reliable form of verification without substantially increasing technical overheads and improves the operation of computing environments and telecommunications networks.

SUMMARY OF THE INVENTION

A first entity may have a piece or item of information describing them or the information may assert a certain property of that entity. A second entity may vouch that this information is correct or valid and can endorse the information describing the first entity. Validation of this information may be carried out by the second entity in advance or at the same time. The information is identified using an identifier that is linked to, associated with or generated from a public key of the first entity or generated by the first entity. This public key has a corresponding private key enabling the first entity (or any holder of the private key) to prove that the particular assertion or information describes the first entity and not another entity (e.g. by means or a verifiable digital signature).

In order to endorse or vouch for the information describing the first entity, the second entity cryptographically signs the information using their private key or cryptographically signs data that is linked to or references the information describing the first entity. This private key corresponds to a public key of the second entity enabling other or entities or parties to verify that the information or data was indeed signed by the second entity. The public keys may be published, for example. The signed information or data (identified as belonging to or associated with the first entity) is then posted or published to a block chain (e.g. as a single transaction or as separate transactions; one transaction adding the information describing the first entity and a second transaction adding data associated with or referencing the information but signed by the second entity). These transactions may be separate or combined. One or more blocks are added to the block chain containing this (or both) transactions. These blocks contain the posted transaction and any other transactions that are posted or published that may contain information that describes this or other entities or signed data referencing this information. Preferably, the block or blocks are added to the block chain by another entity but this can be done by any entity with privileges to add blocks. If the first entity needs to demonstrate or prove that they have a particular attribute or some piece of information that actually describes them (e.g. a claim), then they may provide the identifier of the piece of information to another party. The other party can look up the identifier in the block chain and find the particular transaction, verify the block in the block chain that contains the transaction, verify that the information belongs to or describes the first entity and also verify using the cryptographic signature, that a transaction exists that was indeed signed by the second (trusted) entity that refers to the particular information describing the first entity. The assertion or information describing the first entity can be read and verified in this way without needing to do or repeat any other checks or tests. This does not require any particular trust as this is negated by the cryptographic signatures and the integrity of the block chain. The status or trustworthiness of the second entity may also be stored in a similar way and verified by other (already recorded) entities.

Several types of entities or communities may benefit, especially (but not limited to) financial services. These include: account holders, merchants, user authorities (e.g. major employers, MNOs, Government Departments, etc.) and banks. Consumers may be able to register for a crypto account or wallet with no or minimal documentation or process. Merchants may more easily accept digital payments and with lower fees and overheads. Third parties may have verified knowledge of an individual. This system and method provides that individual with a mechanism to pass this knowledge on to a new party reliably and without the need to re-prove the information. This may result in improved security, better risk decisions and a financial opportunity for the operational role that they may now play in retail and other transactions. Banks in particular may benefit by a significant reduction in the processing (e.g. computer processing) and financial costs of maintaining systems of record and providing the necessary scrutiny to regulators and others. However, the benefits extend to other organisations and entities that transact or communicate with each other.

An entity may have many different attributes or components to its identity. Confidence in the integrity of these ID attributes will increasingly be needed to determine whether or not certain transactions (or other operations) can be performed. For example, is the buyer over 18? Does the buyer live at this address? Does the seller have the right to these funds? Do the parties to this transaction meet the necessary reputation scores?

Whereas consensus mechanisms can promise to do this over time: the problem they face is chicken and egg. The present system and method enables a network of distributed trust to emerge faster. This allows specific attributes to be asserted and for those assertions to be checked, by user or attribute authorities.

Furthermore, the system and method enables a mechanism for attributes of identity to be asserted (claims) by anyone and verified by anyone using a network of signed attestations given by a trusted user and/or attribute authorities, preferably using the internet, from a public blockchain.

Against this background and in accordance with a first aspect there is provided a method for recording data describing a first entity, the data endorsed by a second entity, the method comprising the steps of:

the second entity validating data describing the first entity, wherein an identifier is associated with the data, the identifier being generated from a public key of the first entity;

cryptographically signing data corresponding with the data describing the first entity using at least a private key of the second entity; and posting or publishing a transaction to a block chain including the cryptographically signed data. The first entity (e.g. an individual customer) can prove that a particular item of data refers to them (e.g. their age or address) as the identifier of the data is generated from the public key of the first entity and they hold the corresponding private key. This can work in a similar way to digital signatures, for example. The second entity can validate the data as being correct. This may be in advance, may already have occurred or be carried out at the same time as the other steps. Validating, verifying or confirming the data may be carried out by the second entity viewing a birth certificate, a passport, carrying out electronic verification, retrieving data from a database, or using another mechanism, for example. The use of a block chain provides at least several benefits. These include its public nature, allowing any other party or entity from viewing the data and cryptographic verification of the data enabled by the digital signatures, hashing and layered nature of the block chain. The transaction is a complete and verified unit of data in a form that may be added to the block chain. A transaction passes the information from the second entity to the block chain. The second entity may be a user authority. The data signed by the second entity may be the data describing the first entity itself or a separate item that references the descriptive data, for example. Further or duplicate checks and work may be avoided, which can improve the efficiency of computer networks.

Preferably, the method may further comprise the step of the first entity publishing or posting the data describing the first entity. In other words, the first entity may publicly declare the data. This is identifiable using the identifier (derived from the first entity's public key). The second entity reads these data rather than receiving it directly from the first entity. This may simplify the procedure.

Preferably, the method may further comprise the steps of:
a third entity validating the data describing the first entity;
the third entity cryptographically signing data corresponding with the data describing the first entity using a private key of the third entity; and posting a further transaction including the data cryptographically signed by the third entity. The third entity is preferably a different entity to the second entity (and the first entity). The third entity therefore, adds their own "seal", approval or validation of the data. This further strengthens the validity of the data (e.g. claim or assertion) describing the first entity. Each validating entity may have a different weighting or score. For example, some entities may have a higher weighting, score, trustworthiness or credibility than others. In some embodiments, for the information to be regarded as true or sufficiently validated then the sum of the scores may need to exceed a particular threshold. Therefore, there may be an equivalence of the validity of data validated by a number of low scoring entities and the validity of data validated by a single (or fewer) high scoring entity, for example.

The required level of scoring may depend on the purpose of the information. If the data is address data, for example, then a relatively low score of the second entity may be acceptable to obtain a library card for the first entity. However, if the proof of address was require by a bank to provide a mortgage then a higher score may be necessary (and/or a requirement that more than one or a minimum number of entities have validated the information). As with the second entity, the third entity may sign the data describing the first entity directly or preferably, they may add their approval or attestation of these data by generating a new transaction to the block chain that references the data describing the first entity. This is particularly flexible as the data may have already been "fixed" within an earlier block as so cannot be altered but a new transaction can be added to a subsequent block. Individual attestations may be selectively revoked by subsequent transactions. The privileges of validating entities may be changed or revoked (effectively invalidating their attestation) by yet more transactions on the block chain, for example. Therefore, a particular claim may require validation by further entities to improve its score above a required threshold.

Preferably, the method may further comprise the step of adding a block containing one or more posted transactions to the block chain. A block may comprise one or more transactions.

Optionally, the step of adding a block to the block chain may further comprise hashing at least a part of the block chain and the one or more posted transactions. The hash may include all previous blocks. Therefore, this reduces the risk of tampering.

Preferably, the step of adding the block to the block chain may be carried out by a fourth entity. The fourth entity may be an engine authority.

Preferably, the method may further comprise the step of the fourth entity adding a transaction to the block comprising a public key of the fourth entity.

Advantageously, the step of adding a block to the block chain may further comprise the step of storing the block in a Merkle tree structure. This provides a more efficient storage structure and allows easier validation of the block chain.

Preferably, the block chain comprises a block having a transaction including a public key of the second entity. In other words, any entity (e.g. the second entity) may themselves be validated as an authorisation entity by having their public key added to the block chain. Preferably, this will be conducted by a higher authority or an entity that manages the block chain (e.g. an engine authority). This form of entity authorisation may also be revoked or limited by adding further transactions to the block chain. This particular type of transaction may also be used to add or amend a score to the entity.

Preferably, the method may further comprise the step of posting a further transaction containing a public key of a fifth entity able to endorse data of other entities. In other words, further "second" entities or user authorities may be added in this way.

Optionally, the identifier of the data may be further generated from a random factor generated by the first entity. This may provide privacy of the first entity as the information may be made public or at least distributed in a limited way but it may only be possible to identify the first entity when provided with the random factor. This random factor may be a number or series of symbols, for example.

Optionally, the method may further comprise the step of hashing at least a part of the data describing the first entity before cryptographically signing the data. For example, the name of the first entity may be hashed. This may further improve privacy as the hashed data may be selectively revealed.

Optionally, the data corresponding with the data describing the first entity may include an identifier of the data describing the first entity. This provides a way to associate the data and attestation of the second (or subsequent) entity.

Optionally, the data describing the first entity may be stored by posting a transaction to the block chain that may be separate from the transaction posted including the data cryptographically signed by the second entity. In other words, the data describing the first entity and the cryptographically signed attestation may be store separately either in the same block, in different blocks or even in different block chains.

According to a second aspect there is provided a method for obtaining data describing a first entity the data endorsed by a second entity, the method comprising the steps of:

receiving an identifier of data describing the first entity;

retrieving an entry from a block chain based on the received identifier;

authenticating the entry using a public key of the second entity; and extracting the data describing the first entity from the retrieved entry. In other words, a first entity may prove to another entity a particular assertion, fact, data or other information about them. Because the identified data is stored in a block chain, the information can be verified as being endorsed by the second entity. This second aspect may complement the method of the first aspect.

Preferably, the method may further comprise the step of authenticating a block in the block chain containing the entry using a public key of a third entity. This third entity may be an entity that added to the block chain a block containing the data.

Optionally, the method may further comprise the step of executing a transaction if the authentication of the block in the block chain is successful. In other words, a transaction (e.g. financial or otherwise) may be dependent on the authorisation.

Preferably, the data describing the first entity may be separate (logically or physically) from the retrieved entry from the block chain.

Advantageously, at least a portion of the data describing the first entity may be obscured. This may be by hashing, anonymisation or cryptographically. However, the data may be readable or decryptable by certain entities, organisations or trusted users for specific uses, for example.

According to a third aspect there is provided a system for recording data describing a first entity, the data endorsed by a second entity, the system comprising:

one or more computer processors; and memory storing executable instructions configured to, when executed by the one or more processors, cause the system to:

validate, by the second entity, data describing the first entity, wherein an identifier is associated with the data, the identifier being generated from a public key of the first entity;

cryptographically sign the data using at least a private key of the second entity; and post a transaction to a block chain including the cryptographically signed data.

Optionally, the executable instructions may further cause the system to:

receive an identifier of data describing the first entity;

retrieve an entry from a block chain based on the received identifier;

authenticate the entry using a public key of the second entity; and extract the data describing the first entity from the retrieved entry. Alternatively, there may be one (or more)

system for recording or storing the data and a separate system (or systems) for retrieving and/or authenticating and extracting the data.

Optionally, the executable instructions may further cause the system to generate one or more transactions in the block chain to authorise a third entity to cryptographically sign validated data describing the first entity.

Preferably, the first entity or subject of the piece or item of information or data has control (e.g. full control) over the data and over any the rules for its disclosure (for example, when it can be used and who can see or use it. Therefore, anonymity and security for the first entity or subject may be preserved. The identity of the first entity may be restricted to the holder of their tracking (i.e. private) key. It may not possible to link different facts or information about the same subject (other than with the tracking key). A concept exists of an authority "vouching" for claims. Advantageously, the method may include the ability for later addition of further attestations or retraction of existing ones to take place. Claims or attestations may be posted on the block chain in a variety of forms. They can make any statement about a user (or example, date of birth details or information around a gym membership). In themselves, such information may be worthless without a supporting attestation, however once an attestation has been published, the claim has value (or is valid) until the User Authority retracts the attestation. This may require constant management by the User Authority to ensure claims don't outlive their validity. For example, a claim that a user was over the age of 18 may be permanently supported, whereas a statement about someone's financial status should not.

To manage this, business rules, caveats, restrictions of other rules may be included in the original claims. For example, a claim about someone's credit status may take a form similar to:

"This user has been deemed credit worthy up to a maximum unsecured lending amount of £5,000 (or other amount) based on an assessment performed on the 1 Jul. 2016 (or other date) and considered valid for 30 days (or other period)"

The supporting User Authority may submit an attestation to this claim that could be retained indefinitely. It would not be possible to change the criteria of the published claim, so the attestation would automatically lose its worth after the criteria were no longer met (though may still have some value—in the above example, it would be apparent that at the specified time the user had a good credit worthiness).

Claim definitions may be created in such a way that they refer to one another—e.g. Claim 123455—"This user has an Advanced Driving License", supported by an attestation from the Institute of Advanced Motorists claim 123456—"This user has been deemed eligible for agreed value car insurance as long as claim 123455 is still valid and supported", supported by XYZ car insurance.

In other words criteria may include the requirement that one or more other claims remain valid or have valid attestations.

The concept of claims may be extended (i.e. beyond things which are expressly asserted by the Wallet Holder) to include 'things that are earned or learned from activities or transactions or other information howsoever derived.

For example, a work or home address could be claimed and then verified by the employer or Utility company (or other entity in a position to be able to verify this fact). Alternatively an address could be derived from other information available to the attester. For example, the dwell location of a mobile phone handset between particular hours was predominantly xxx xxx and then between these hours was predominantly yyy yyyy. These data may indicate a home or workplace location. Home may be during the night (and/or weekends) and work may be during the day, for example. In both situations the system may assume that the person or Wallet holder entity about whom a claim is being made, is ultimately responsible and in charge of giving out the necessary keys to decrypt and/or read and/or verify a claim. A second example of a derived claim could be an aggregation of consumer spend and the calculation of 'average life time value' against a specific category of goods or service. Once again only the wallet holder or entity about whom/ which a claim was being made would be able to make this information accessible to third parties or under other circumstances. Derived claims may also be known as badges or awards.

In other examples the first entity (or wallet) may is not necessarily a person. For example, the entity may be an item or object (e.g. internet of things item). Examples may include vending machines that need stocking or utility supply pricing or others.

There is also provided an electronic device comprising: a processor; and a memory storing a software program, wherein the software program, when executed by the processor, causes the processor to perform the method disclosed above.

There is also provided a software program configured to perform the method disclosed above, when executed on a processor of an electronic device.

The methods described above may be implemented as a computer program comprising program instructions to operate a computer. The computer program may be stored on a computer-readable medium.

The computer system may include a processor such as a central processing unit (CPU). The processor may execute logic in the form of a software program. The computer system may include a memory including volatile and non-volatile storage medium. A computer-readable medium may be included to store the logic or program instructions. The different parts of the system may be connected using a network (e.g. wireless networks and wired networks). The computer system may include one or more interfaces. The computer system may contain a suitable operating system such as UNIX, Windows® or Linux, for example.

It should be noted that any feature described above may be used with any particular aspect or embodiment of the invention. Furthermore, each aspect may be combined with any one or more other aspect.

BRIEF DESCRIPTION OF THE FIGURES

The present invention may be put into practice in a number of ways and embodiments will now be described by way of example only and with reference to the accompanying drawings, in which:

FIG. 9 shows the data structure of FIG. 5 partially populated with example data;

FIG. 10 shows an example transaction; and

It should be noted that the figures are illustrated for simplicity and are not necessarily drawn to scale. Like features are provided with the same reference numerals.

DETAILED DESCRIPTION OF THE PREFERRED EMBODIMENTS

A block chain schema and secure operational process allows one or many third parties to individually or collectively vouch for the identity and/or reputation and/or other attribute (e.g. over 18, address, can drive, etc.) of a registered or other supported user (e.g. a crypto currency wallet holder) for the purpose of approving financial, communication or other transactions. The system also provides a mechanism for weighing of opinion and/or resolving pseudonyms with their primary registration authority.

In one example implementation, the system is comprised of two main interdependent components:

1. A user authority engages the wallet holder (individual or entity) and can vouch for their identity or other data describing them.

2. Prospective wallet holders or entities may allow one party to vouch for their identity whilst allowing another to hold their funds and to associate those funds with a pseudonym, as opposed to a verified identity.

The system supports a number of different operations including but not limited to:

1. A user authority can post assertions about a specific user or entity.

2. An engine authority can validate an assertion and accept it into the distributed record.

3. An engine authority can manage user authorities, specifying what assertions they are allowed to make.

4. An agent can verify an identity and review assertions made by user authorities in response to a claim by a User.

Users may also post claims that are subsequently verified by user authority assertions.

Data published on the structure may consist of:

1. Assertions or claims about a particular user ID ("Claims tree");

2. Attestations supporting the assertions or claims ("Attestations tree");

3. Approved authorities who are able to post assertions (the "Authorities tree"); and 4. Approved authorities who are able to perform assertions/authority changes into blocks on the block chain.

All assertions or claims, attestations and changes to the status of an authority are published as transactions, pending inclusion in the block chain and incorporation into the public "trees" of data by an approved engine authority.

The block chain and the data "trees" may be distributed and preferably with a copy being held by more than one engine authorities and continually synchronised over a peer-to-peer network.

Figure 1:
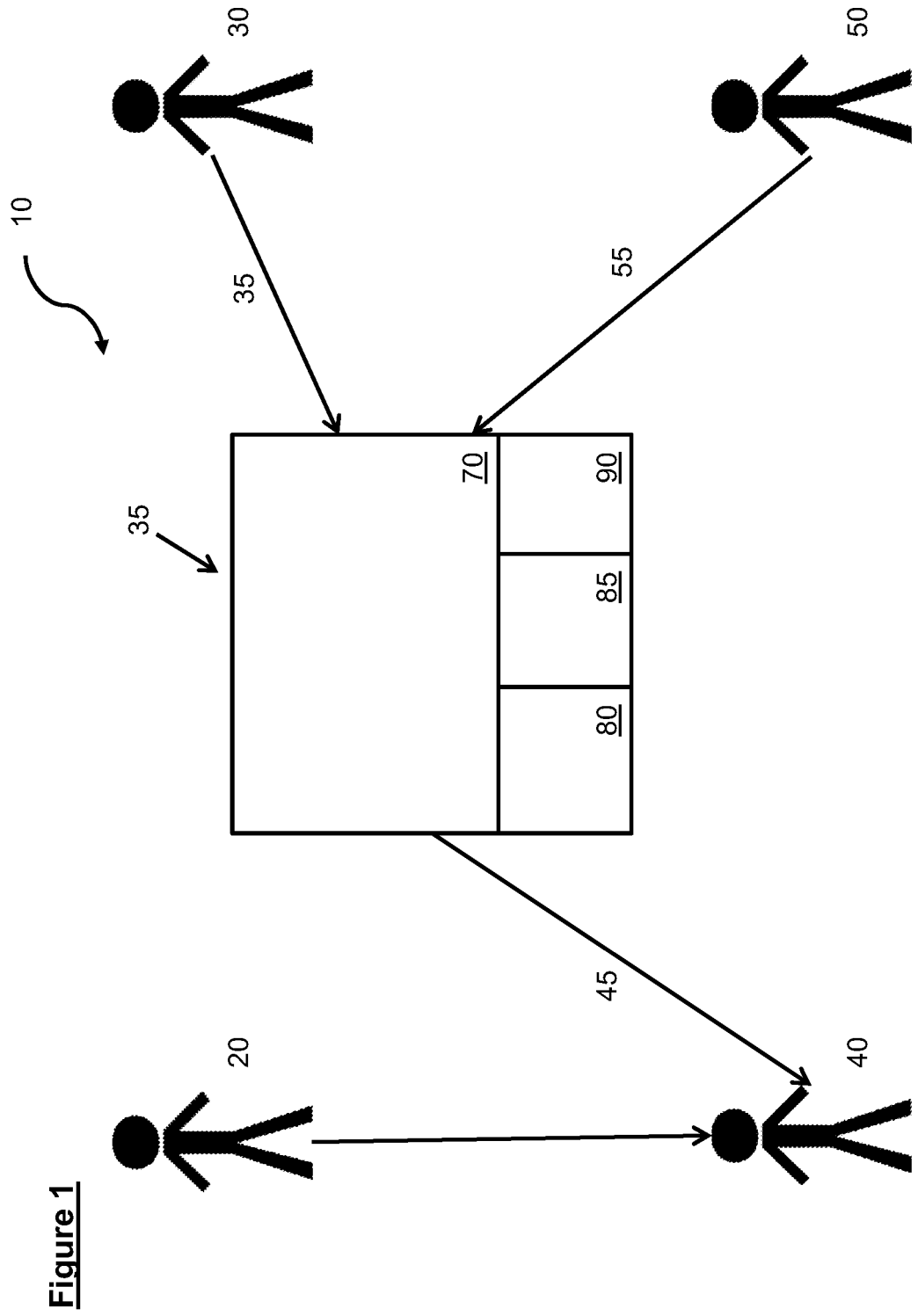
FIG. 1 shows a schematic diagram of a system for recording data describing an entity, given by way of example only.

FIG. 1 shows a schematic diagram of a system 10 for recording data describing a first entity 20 (e.g. a customer). The first entity 20 provides data describing themselves (e.g. an assertion, property or other fact) to a second entity 30 (e.g. a user authority). The data describing the first entity may be the data itself or a reference or identifier to the data (or assertion), for example. The first entity 20 generates a transaction to post the data to a data store 60. The second entity or user authority 30 validates these data by carrying out certain checks. For example, if the data describing the first entity 20 is their age, then the second entity 30 may validate the data by checking a birth certificate or passport. The second entity 30 may already have knowledge of the first entity 20 and so validation or verification of the information may not need to take place at that time but may be based on the retrieval of confirmatory information from a separate data store, for example.

The assertion or data describing the first entity 20 has been posted or published by the first entity 20 within a portion of the data store in the form of a block chain. However, for illustrative purposes this is shown in FIG. 1 as a logical partition (claim logical partition 80) of the data store 60. This claim may be retrieved and reviewed by the second entity 30. Posting of the data may be performed by the first entity or by another entity.

Once the data describing the first entity (e.g. one or more assertions or claims) have been validated by the second entity 30, then the second entity 30 may generate a claim attestation. This is achieved by the second entity or user authority 30 generating a further transaction (arrow 35) including the attestation that references the first entity's claim along with an identifier of the second entity 30. This further transaction is posted to the block chain stored within data store 60 (again, shown logically in figure one as a user authority logical partition 85 of the data store 60). Subsequent requests for data may be handled by a verification engine and processor 70.

Entities (e.g. the second entity 30) that are able to validate assertions and information describing one or more first entities 20 may be added or removed from the system 10. This is achieved by an engine authority 50 that submits these additions, edits or deletions, as shown by arrow 55. These recognised authorities are stored within the block chain stored in the data store 60 (shown as a separate recognised authority logical partition 90 in FIG. 1).

When the first entity 20 needs to prove an assertion then they may present the reference or identifier of the data (e.g. claim or assertion) to another entity (e.g. agent 40). The agent 40 may retrieve the referenced data by reading the block chain within the data store 60 (shown as arrow 45) and carry out checks to ensure that the data has been verified (or sufficiently verified) by one or more second entities (user authorities) 30 by retrieving any associated attestations.

All of the transactions stored within the data store 60 are stored in a tree structure as part of one or more block chains. Although the logical partitions (80, 90) of FIG. 1 are shown as separate portions of the data store 60, these may be stored together as part of a larger block chain, for example. Whilst the data store 60 is shown as having a single location, the data store 60 may be a distributed data store spread over a number of different locations (e.g. a peer-to-peer network or cloud computing environment).

Figure 2:
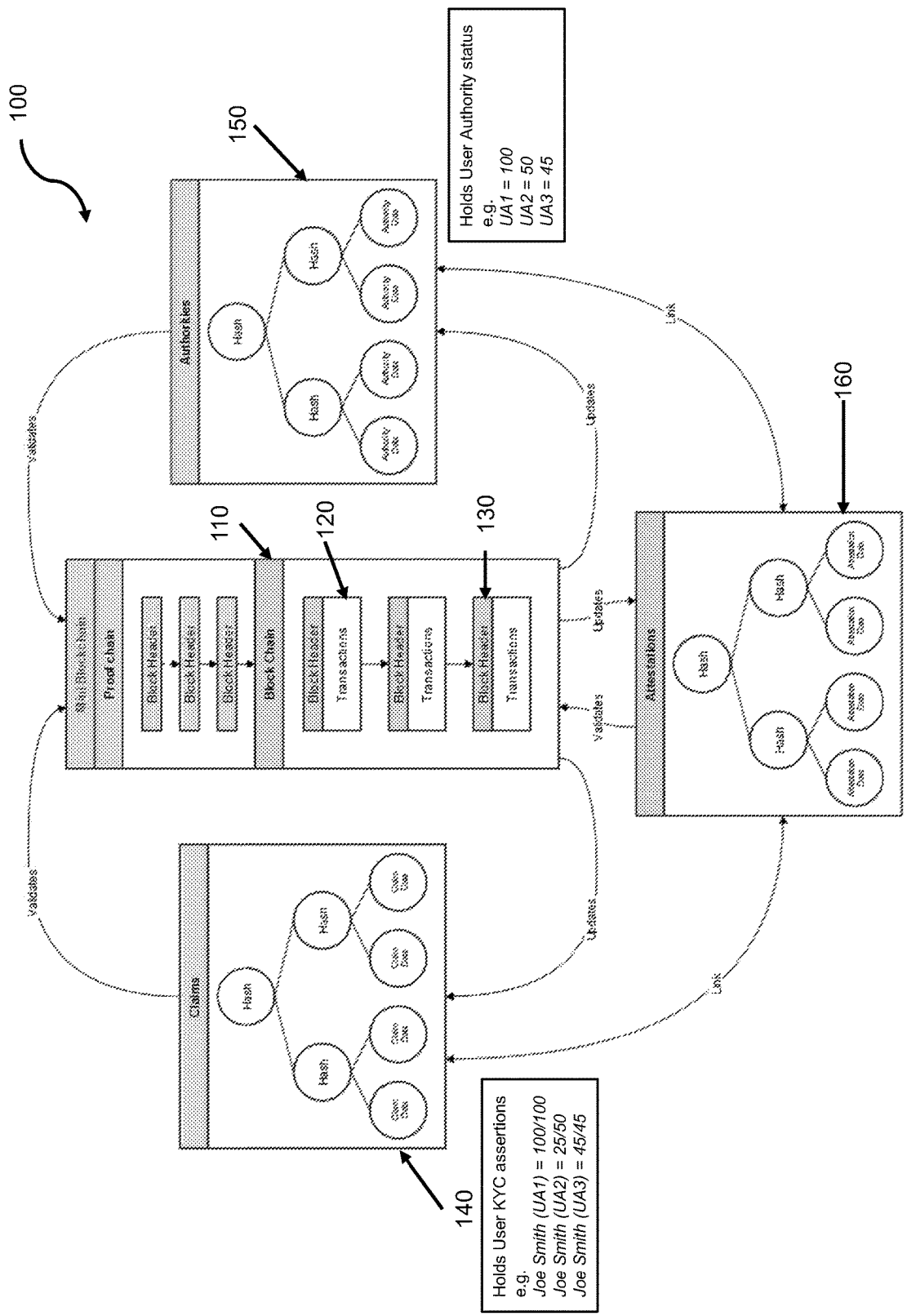
FIG. 2 shows a flowchart of a method for storing, retrieving and validating data.

FIG. 2 shows a flowchart and schematic diagram of a method 100 for storing, retrieving and validating data describing the first entity 20. FIG. 2 shows more detail regarding the data structure of the data store 60 and also shows a high level logical structure of a block chain 110 used to record the data in a form that may be validated by other entities. This block chain 110 is stored in the data store 60, described with reference to FIG. 1. In this example, the data describing the first entities 20 are user assertions or claims. These claims are pieces of information used in a "Know Your Customer" (KYC) context. The claims are stored within the block chain 110 as transactions 120. Each transaction has a block header 130.

Data are preferably persisted through Merkle trees (although other formats may be used) with any additions or updates to the data submitted through operations or transactions on the block chain 110. A claims tree 140 within the block chain 110 stores the claims or assertions (data describing one or more first entities 20). The data describing each entity 20 is validated by one or more user authorities (i.e. one or more second entities 30). The particular second entity 30 (e.g. user authority: UA1, UA2, UA3, etc.) are associated with the items of data that they have validated. Each user authority 30 may have a particular status, score or weighting. For example, a user authority with a high status may have a score of 100. A low weighting may be a score of 45, for example. Any arbitrary range, scale or permissions may be used or each user authority may have the same weighting. These scores may vary over time. User assertions may be validated by one or more user authorities 30. The sum of the scores of each user authority validating (or vouching for) a particular assertion or claim may represent the score of that particular assertion, fact, claim or data item.

The data describing the one or more first entities 20 are stored as transactions within the block chain 110 (structured as a claim data tree 140). In one example, the structures of the block chains, transactions and headers are similar to those described in https://bitcoin.org/bitcoin.pdf. As described with reference to FIG. 1, user authorities may be added (or removed). User authority details are persisted as a user authorities tree 150. Again, the authorities tree 150 may have the structure of a Merkle tree (or other structure) and stored within the block chain 110. Transactions 120 within the block chain 110 (e.g. additions, deletions or amendments) record the details of the user authorities. In this case, an engine authority 50 generates the transaction 120.

Although claims have been added to the block chain 110 (and may be retrieved and read accordingly), these claims have not necessarily been validated, checked or vouched for by any of the user authorities 30. Once a claim is confirmed or validated by a user authority 30 then they can generate a transaction 120 within the block chain to record that as an attestation. These attestations are persisted as a separate attestations tree 160 that also takes the form of a Merkle tree (or other form).

Figure 3:
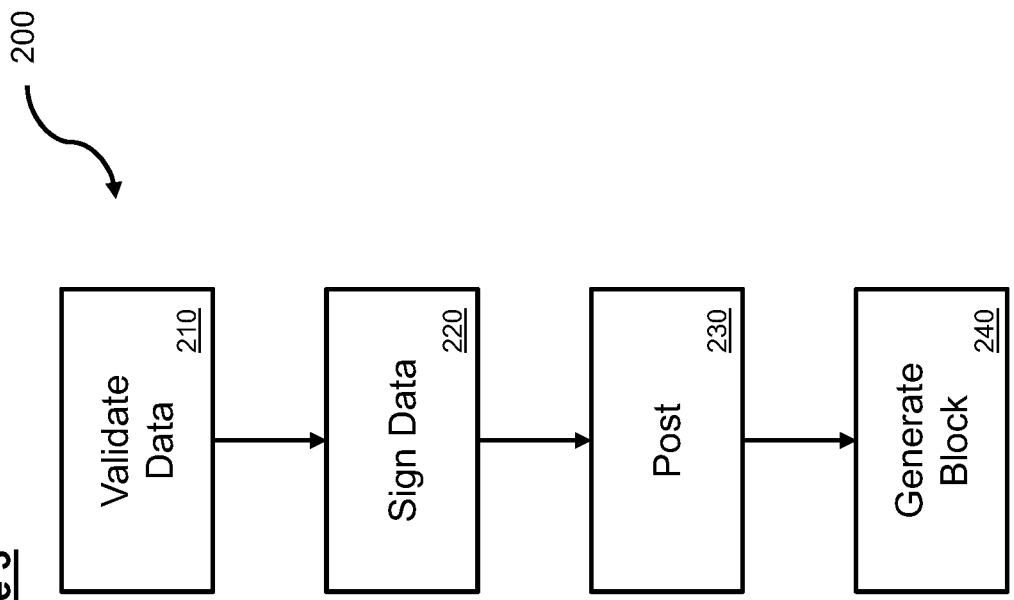
FIG. 3 shows a flowchart of a method for recording data describing an entity.

FIG. 3 shows a flowchart of a method 200 for recording data describing the first entity 20. At step 210, the data is validated by the second entity 30. The second entity 30 signs data corresponding to the data describing the first entity at step 220. The signed data is posted to the block chain 110 at step 230. A block is generated at step 240. The block contains one or more transactions containing signed and validated data.

Figure 4:
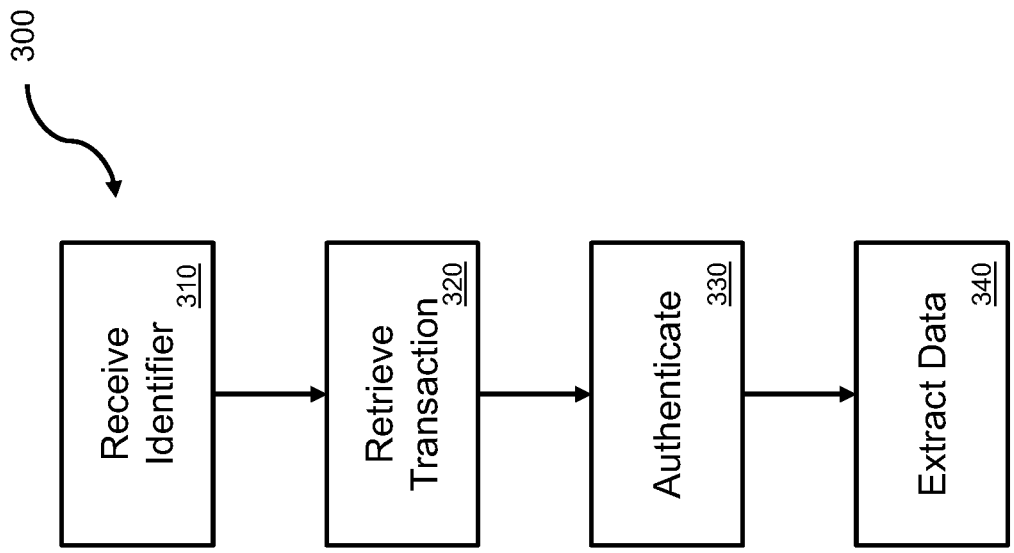
FIG. 4 shows a flowchart of a method for retrieving data describing an entity.

FIG. 4 shows a flowchart of a method 300 for retrieving data describing the first entity 20. An identifier of the data is received at step 310. This may be, for example, received from the first entity 20 or elsewhere. Based on this received identifier, a particular transaction from within the block chain 110 is retrieved at step 320. The transaction may be authenticated using cryptographic techniques such as reviewing the hash of the block containing the transaction and any digital signatures stored as part of the block. Authentication may also involve retrieving one or more further items or transactions from the block chain 110 that reference the data describing the first entity and have been signed by a second (or third) entity. This authentication occurs at step 330. The data describing the first entity 20 is extracted at step 340. This may be a simple extraction of plain text data or encryption techniques or hashing may be used to extract the data to improve privacy and prevent a wider distribution of the information described in the first entity 20.

Figure 5:
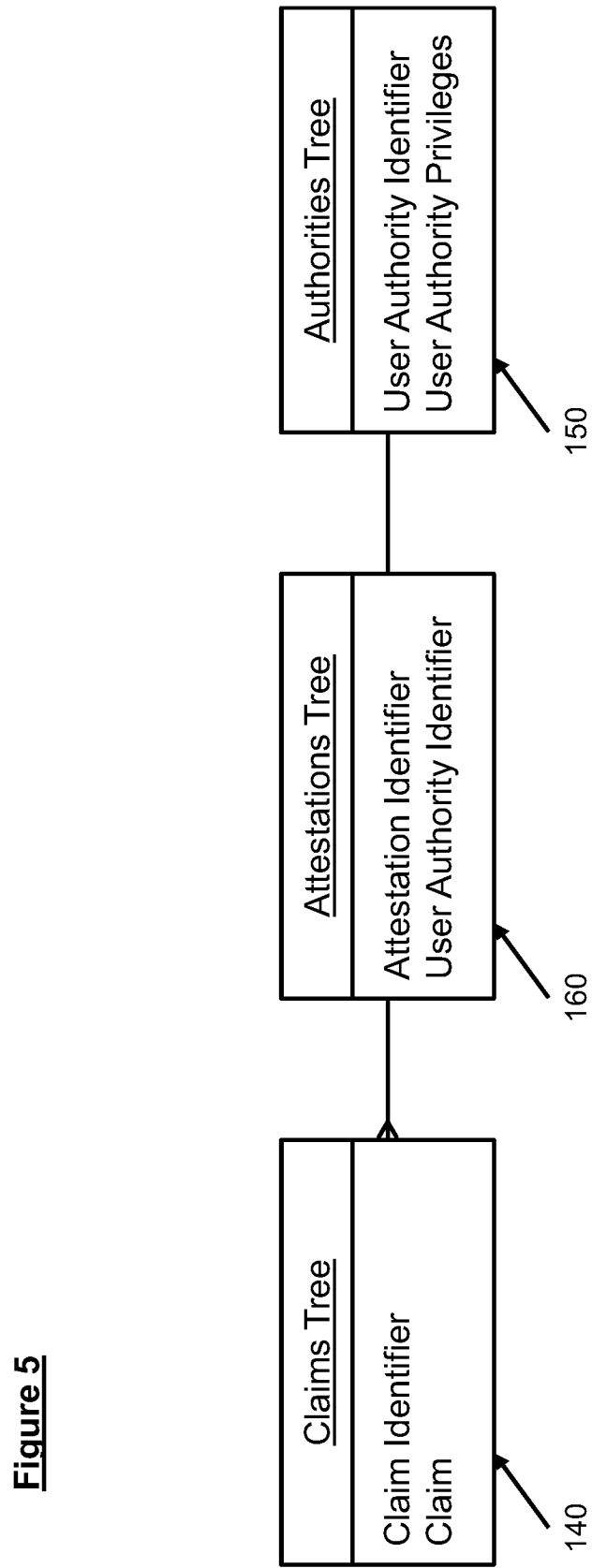
FIG. 5 shows a schematic diagram of a data structure, described by way of example only.

FIG. 5 shows a schematic diagram of a data structure of the claims tree 140, the attestations tree 160 and the authorities tree 150. In particular, entries in the claims tree (i.e. individual claims) contain a claim identifier and the claim itself. Entries in the authorities tree 150 contain a user authority identifier and optionally, privileges for that identified user authority. These privileges may include but are not limited to the ability to vouch for particular types of claims (and/or first entities), a weighting or score associated with any attestations that they make or any other privileges. Data entries within the attestations tree 160 include an attestation identifier and a user authority identifier.

Figure 6:
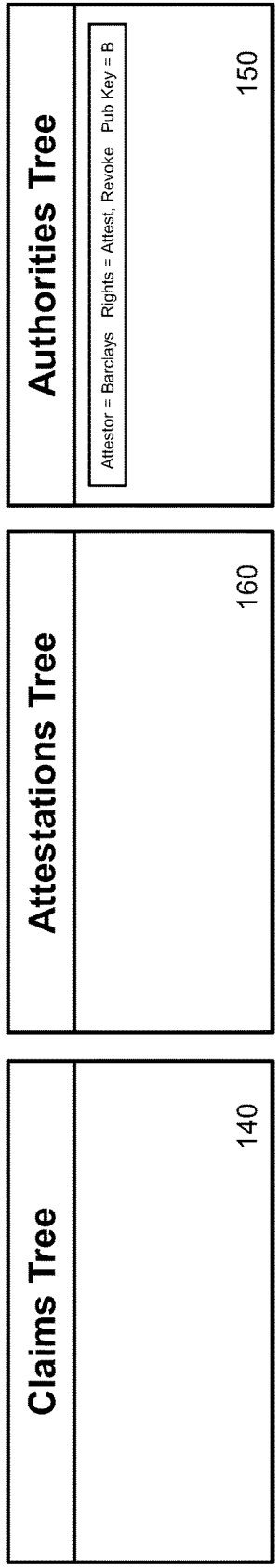
FIG. 6 shows a schematic diagram of the data structure of FIG. 5 partially populated with example data.
Figure 7:
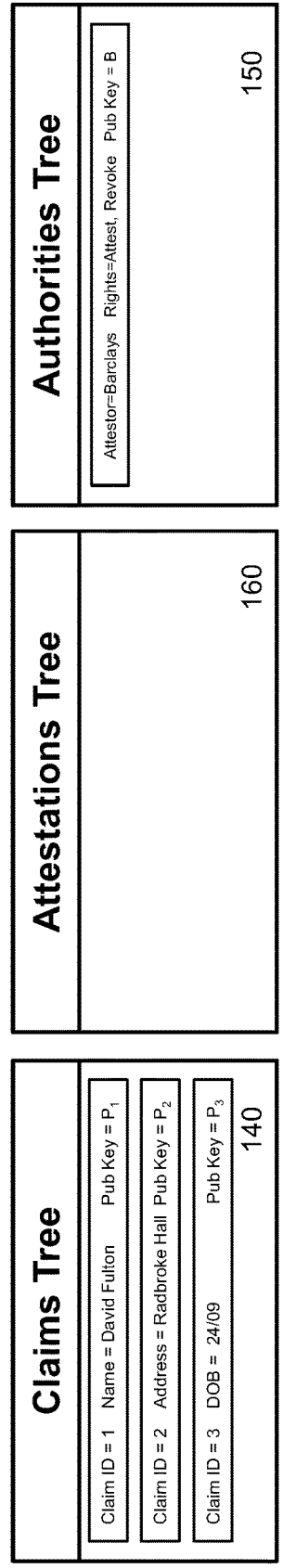
FIG. 7 shows a schematic diagram of the data structure of FIG. 5 partially populated with example data.

The following describes a worked example of adding a claim and validating or attesting to a claim by a user authority 30. Initially, there may be no claims or attestations. However, a particular user authority 30 (e.g. Barclays) has attestation rights, as shown in FIG. 6. A user (first entity 20) may register for the system (e.g. by downloading a particular mobile application or registering using a browser) and supplies specific registration data. In this example, the data describing the first entity 20 is their name, address, and date of birth (in this example, three separate items with claim identifiers 1, 2 and 3). These details are unverified at this point but have still been captured within the claims tree 140, as shown in FIG. 7. Each claim may be created using a create_claim operation that is submitted and posted on to the block chain 110 as a transaction. Posting a claim to the block chain 110 may involve publishing or broadcasting the claim as a transaction. For example, where the block chain 110 is distributed within a peer-to-peer network then posting the transaction to the block chain 110 may involve providing one of the peers with a copy of the transaction, which is then propagated to other peers. The claims are submitted using a public key supplied by the user (which may be generated as part of the registration process on their own device, for example). The transaction may be "mined" by adding a block containing the particular transaction to the block chain 110. In order to improve privacy, the specific details of each claim may be hashed or otherwise obscured but in the example shown in FIG. 7, the details are shown as plain text for clarity.

Figure 8:
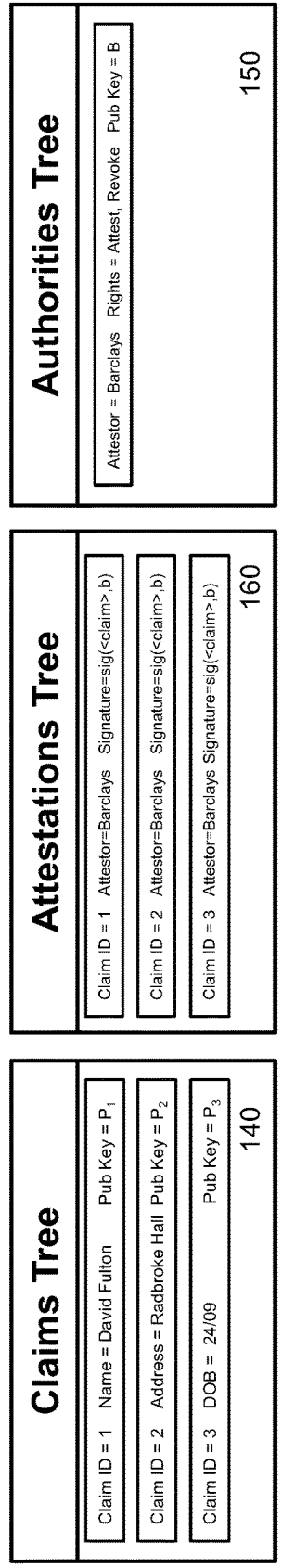
FIG. 8 shows a schematic diagram of the data structure of FIG. 5 partially populated with example data.

FIG. 7 shows the data generated by a user authority 30 validating or attesting to the validity of each claim (1, 2, 3). For example, the attester "Barclays" may have already obtained particular proof of the validity of each claim. The individual concerned may have provided documentation proving their name, address and date of birth in the past as part of an earlier process or may do so at this stage. The user authority 30 may then add entries to the attestation table tree by posting transactions (i.e. a create attestation operation) to generate individual transactions within the block chain 110, as shown in FIG. 8.

It is noted that each claim in the claims tree 140 has an identifier that is referenced within each attestation in the attestations tree 160. Furthermore, the particular attester for each attestation is also recorded in the attestations tree along with their signature. The attester's particular signature and identifier is stored within the authorities tree 150. Once the attestation transactions have been mined, then the data are effectively confirmed.

Once data describing an entity have been posted and verified and at least one second entity has vouched for their authenticity then other entities may use the system 10 as part of further processes. For example, a financial transaction may take place that relies on one or more claims from the first entity 20 being correct. There is no need for the first entity to carry out their own checks as these have already been conducted, as can be proven from the block chain 110.

The following example illustrates how a transaction can be conducted that is dependent on a verified claim by a particular first entity 20. This claim is highlighted in FIG. 9 by a box around claim 3 in the claims tree 140. Claim 3 has an associated public key P3 that was generated using a public key of the first entity 20. Therefore, the first entity 20 can use their corresponding private key to prove that claim 3 relates to them (as this is dependent on the possession of the corresponding private key). A corresponding attestation is highlighted in the attestations tree 160. The particular attester is highlighted in the authorities tree 150.

FIG. 10 illustrates a transaction dependent on claim 3. The transaction is for the transfer of funds but other types of transaction may be use (e.g. the transfer of data). The transaction was from a Customer to a Merchant but can only be completed if the customer's claim of their date of birth is valid (e.g. that they are old enough to purchase a particular item). The transaction itself is signed by the customer but details of the claim are also included. In particular, the claim identifier and its public key (P3) are included so that the attestations for this claim can be verified subsequently if necessary.

Figure 11:
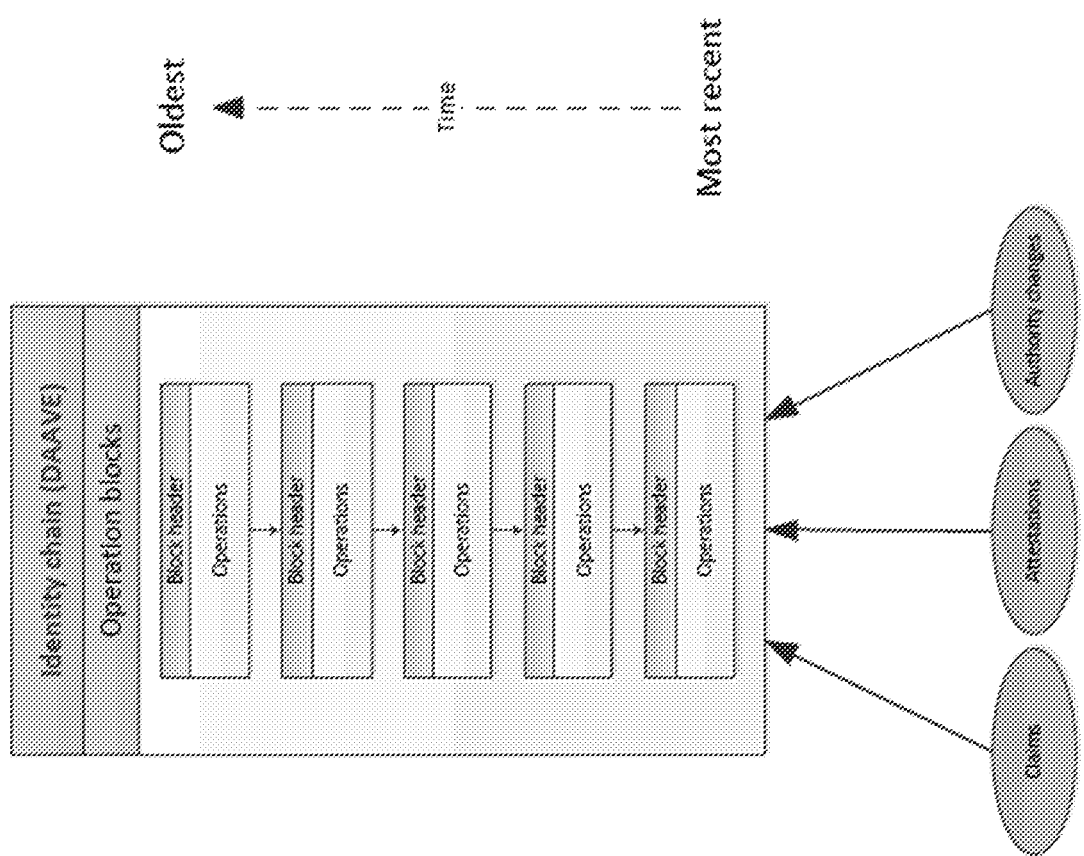
FIG. 11 shows a schematic diagram of a portion of the system for recording data describing an entity.

FIG. 11 shows a schematic diagram of the blockchain 110 and how it is populated with claims, attestations and authorities (or authority changes). Each transaction forms one of a number of possible operations within the block chain 110. For example, an operation may involve adding a claim, adding an attestation to a claim or making a change to (e.g. deletion, changing a weighting, adding or removing privileges, etc.) to a user authority 30. Operations may take place to update an earlier transaction or operation or to create a new data item or entity (e.g. adding a new user authority 30). In this way, the block chain 110 may be built up from oldest to newest operations.

As will be appreciated by the skilled person, details of the above embodiment may be varied without departing from the scope of the present invention, as defined by the appended claims.

For example, whilst the first entity may post claims about themselves, other entities (e.g. authorities) may do so on their behalf. Alternatively, claims may be posted automatically. For example, if a particular transaction or communication requires a particular claim type then that claim may be generated automatically (using the public key of the first entity). The claim may also be generated and posted by user authority. For example, if a user authority has verified a particular item of data describing a customer or other entity then they may generate a corresponding claim. This user authority (and/or others) may also generate the attestation and post both as separate (or joint) transactions to the block chain.

Although only one engine authority (that mines blocks and/or adds user authorities) is described, more than one engine authority may be authorised. This may be achieved in a similar way to adding user authorities with transactions posted to the block chain (e.g. as part of the authorities tree 150). In an alternative implementation, other mechanisms may be used to maintain an authentic block chain (e.g. by using proof of work similar to Bitcoin). This may not require user authorities at all.

The data formats may be standardised and the transactions posted to the block chain may contain additional or different information.

Whilst the examples provided above relate to the entity being a person or a company (or other organisation), the entity may also be a physical object. Such objects may have some processing power and the ability to interact with their surroundings (e.g. through sensors and communication interfaces). These items may form part of an internet of things and can exchange information with other objects, connected devices and entities. An entity or "thing" may be a physical object embedded with electronics, software or sensors and have an ability to exchange data with other connected devices. Although each item or entity may always be uniquely identifiable through its embedded computing system, the described method and system may provide additional functionality to augment that identity with one or more signed assertions acting like a provenance mark to identify the relationship between some things and humans or companies or bank accounts, for example. The entity may hold the key that enables it to prove ownership of the claim or an owner or other entity may hold the key and use it to prove ownership of the claim, for example.

In an example, the object may be capable of sending or receiving funds and/or may have a need to have a verified identity (e.g. is the battery from which we are taking power owned by the person to whom we are paying funds?) Such questions may be answered by checking the status of various claims relating to, referenced by or linked to the object using the verification techniques, described above. Whilst user authorities have been described, they may equally be referred to as attribute authorities (i.e. extend beyond validating users to attributes of any type of entity).

Publishing or posting a transaction (of any type) to a block chain may involve providing the transaction to a (or several) miner. This may be achieved by a direct communication or by depositing the transaction at a particular location to be picked up by a miner, for example.

Should a user lose their private key or keys then they will not be able prove that a claim belongs to or relates to them. Claims and attestations may then need to be recreated. However, there is a way to effectively recover lost private keys or at least the claims and attestations. All claims may have one-time public key based on a user's master identity. If a user had chosen to share their master identity and the corresponding tracking key with a User Authority, then that User Authority would be able to identify all of their original claims and supporting attestations. A User Authority may be granted sufficient access rights to re-create the claims and migrate all the supporting attestations on the block chain following some operational process where a user can prove their identity to the User Authority via some other means (they might also either delete the old claims, or add an additional attestation to record the fact that the key for these may have been compromised).

Where this becomes more complex, is when other authorities have also supported the claims. A "Super" User Authority may be granted with a right to migrate supporting attestations made by other User Authorities, but they'd need to be watching the block chain all the time to see what has happened to their entries.

An alternative solution would be for one User Authority to migrate all the claims and their own attestations and then add in a further special attestation that highlights that they oversaw the migration. Any other user authority could pick this up at a later date and, assuming that they trusted the first User Authority, they could then choose to migrate their own entries. This route would be slower but would ensure that every User Authority retained full control over their own entries.

Many combinations, modifications, or alterations to the features of the above embodiments will be readily apparent to the skilled person and are intended to form part of the invention. Any of the features described specifically relating to one embodiment or example may be used in any other embodiment by making the appropriate changes.

The invention claimed is:

1. A method for recording data describing a first entity, the data endorsed by a second entity, the method comprising the steps of:
   at the second entity:
      validating data describing the first entity, wherein an identifier is associated with the data, the identifier being generated from a public key of the first entity;
      cryptographically signing data corresponding with the data describing the first entity using at least a private key of the second entity; and
      posting a first transaction to a block chain including the cryptographically signed data;
   at a third entity:
      validating the data describing the first entity;
      cryptographically signing data corresponding with the data describing the first entity using a private key of the third entity;
      posting a second transaction including the data cryptographically signed by the third entity; and
   at a fourth entity:
      determining that the data describing the first entity is sufficiently validated if one or more characteristics of each of the second entity and third entity meet validation criteria.

2. The method of claim 1 further comprising the step of the first entity publishing the data describing the first entity.

3. The method according to claim 1 further comprising the step of adding a block containing one or more posted transactions to the block chain, wherein the step of adding a block to the block chain further comprises hashing at least a part of the block chain and the one or more posted transactions, wherein the step of adding the block to the block chain is carried out by the fourth entity and the fourth entity adding a transaction to the block comprising a public key of the fourth entity.

4. The method according to claim 3, wherein the step of adding a block to the block chain further comprises storing the block in a Merkle tree structure.

5. The method according to claim 1, wherein the block chain comprises a block having a transaction including a public key of the second entity.

6. The method according to claim 1 further comprising the step of posting a further transaction containing a public key of a fifth entity able to endorse data of other entities.

7. The method according to claim 1, wherein the identifier of the data is further generated from a random factor generated by the first entity.

8. The method according to claim 1 further comprising the step of hashing at least a part of the data describing the first entity.

9. The method according to claim 1, wherein the data corresponding with the data describing the first entity includes an identifier of the data describing the first entity, wherein the data describing the first entity is stored by posting a transaction to the block chain separate from the transaction posted including the data cryptographically signed by the second entity.

10. A non-transitory computer-readable medium carrying a computer program comprising program instructions that, when executed on a computer, cause the computer to perform the method of claim 1.

11. The method of claim 1, wherein the data describing the first entity includes an assertion by the first entity about an attribute of the first entity.

12. A system for recording data describing a first entity, the data endorsed by a second entity, the system comprising:
   one or more computer processors; and
   memory storing executable instructions configured to, when executed by the one or more processors, cause the system to:
      at the second entity:
         validate data describing the first entity, wherein an identifier is associated with the data, the identifier being generated from a public key of the first entity;
         cryptographically sign data corresponding with the data describing the first entity using at least a private key of the second entity; and
         post a first transaction to a block chain including the cryptographically signed data;
      at a third entity:
         validate the data describing the first entity;
         cryptographically sign data corresponding with the data describing the first entity using a private key of the third entity;
         post a second transaction including the data cryptographically signed by the third entity; and
      at a fourth entity:
         determine that the data describing the first entity is sufficiently validated if one or more characteristics of each of the second entity and third entity meet validation criteria.

13. The system of claim 12, wherein executable instructions further cause the system to:
   receive an identifier of data describing the first entity;
   retrieve an entry from the block chain based on the received identifier;
   authenticate the entry using a public key of the second entity; and
   extract the data describing the first entity from the retrieved entry.

14. The system according to claim 12, wherein the first entity publishes the data describing the first entity.

15. The system of claim 12, wherein executable instructions further cause the system to add a block containing one or more posted transactions to the block chain, wherein the step of adding a block chain further comprises hashing at least a part of the block chain and the one or more posted transactions, wherein the step of adding the block to the block chain is carried out by the fourth entity and the fourth entity adding a transaction to the block comprising a public key of the fourth entity.

16. The system of claim 15, wherein when the executable instructions cause the system to add a block to the block chain, the block is stored in a Merkle tree structure.

17. The system of claim 12, wherein the block chain comprises a block having a transaction including a public key of the second entity.

18. The system of claim 12, wherein executable instructions further cause the system to post a further transaction containing a public key of a fifth entity able to endorse data of other entities.

19. The system of claim 12, wherein the identifier of the data is further generated from a random factor generated by the first entity.

20. The system of claim 12, wherein executable instructions further cause the system to hash at least a part of the data describing the first entity.

21. The system of claim 12, wherein the data corresponding with the data describing the first entity includes an identifier of the data describing the first entity, wherein the data describing the first entity is stored by posting a transaction to the block chain separate from the transaction posted including the data cryptographically signed by the second entity.

22. The system of claim 12, wherein the data describing the first entity includes an assertion by the first entity about an attribute of the first entity.

\* \* \* \* \*